Patented May 19, 1942

2,283,409

UNITED STATES PATENT OFFICE 2,283,409

PREPARATION OF FELT

Boris Berkman, Chicago, Ill., assignor to Milkweed Products Development Corporation, Chicago, Ill., a corporation of Illinois No Drawing. Application March 17, 1939, Serial No. 262,422

3 Claims. (Cl. 117—56)

My invention contemplates and provides an improved method for the preparation of animal or vegetable fiber felts, and especially of a felt or batting produced from the seed hairs or floss of the milkweed plant.

The commercial utilization of the common milkweed has been the subject of much speculation by the casual observer of the plant. The conspicuous and rather beautiful, silky, white floss yielded by the seed capsules or pods of this plant has attracted especial interest. With the exception of some sporadic and uniformly unsuccessful endeavors to convert milkweed floss into textile fabrics, no serious practical attempts to utilize the floss are known to have been made. A factor contributing to this situation has been the dearth of information upon the physical and chemical properties of milkweed floss.

Milkweed floss consists of the seed hairs of plants of the genus Asclepis, characteristic branch of the family Asclepiadaceae. The floss is separated from the seeds by the use of methods disclosed in Letters Patent No. 2,223,543, issued December 3, 1940, and in my application Serial No. 280,317, filed June 21, 1939. The pure, free floss has very good heat insulating properties, as disclosed in the above mentioned copending application and United States Letters Patent No. 2,223,543. This is partly the result of the air spaces between the fluffy fibers, and of the air within the hollow fibers themselves. Milkweed fibers consist of smooth, hollow tubes, much finer than hairs, approximately one inch in length. They are very springy and elastic. The fibers are covered with a wax-like substance, whose function in nature is undoubtedly to repel moisture. Milkweed floss consists chiefly of cellulose, which insures freedom from deterioration and susceptibility to attack by vermin. Indeed, the composition of the floss is remarkably similar to that of wood, as shown by the following analysis:

|  | Per cent |
|---|---|
| Lignin | 22.18 |
| Pentosans | 34.55 |
| Methyl pentosans | 1.05 |
| Methoxyl | 3.60 |
| Cellulose | 60.40 |
| a-Cellulose in cellulose | 58.64 |
| Soluble in alcohol | 4.28 |
| Soluble in ether | 1.35 |
| Ash | 0.97 |

It is one of the objects of my invention to utilize these desirable properties of milkweed floss in the preparation of a new and valuable felt having a very low coefficient of heat conductivity, great lightness and fluffiness, yet withal considerable mechanical strength.

It is another object of my invention to provide a method for the preparation of felt from milkweed floss and indeed from all fibers, both vegetable and animal, that have previously been regarded as unsuitable for felting.

Further objects and advantages of my invention will become apparent from reading the following specification.

The problem of preparing felt from the raw milkweed fibers is beset with difficulties. Because of the waxy coating of the fibers, they are not readily wetted by liquids, so that it is difficult to chemically treat the fibers.

Another difficulty that has prevented the commercial utilization of the floss is the exceedingly small diameter of the fibers and their smooth outer surface caused by the waxy coating previously mentioned. For this reason it is essential that the waxy coating be removed by appropriate chemical treatment. If this is not done, the smooth fibers refuse to cohere and form a felt-like mass substantially identical to animal felt.

The preliminary treatment of the floss to remove the waxy substance from its surface consists in soaking the floss in an aqueous solution of tribasic sodium phosphate of about $\frac{3}{10}$% to $\frac{7}{10}$% concentration to which a commercial wetting agent such as "Calgon" (0.15%) or "Aerosal" (just a few drops of dilute solution) has been added. "Calgon" is the trade name for sodium hexa metaphosphate, and "Aerosal" is the trade name for an ester of sulfonated dicarboxylic acid. The selection of a proper wetting agent is very important, and the wetting agent should not be taken in excess, so that the fibers may immerse readily and completely within a few minutes, thereby facilitating the penetration of the sodium phosphate into the interior of the hollow fibers. The mass of down must constantly be stirred, and precautions taken that the temperature of the dewaxing solution does not exceed 70° F.

As the mixture of floss and solution is agitated, the solution turns a light yellow from the waxy substance dissolving in it. I have found that it is occasionally necessary to use two changes of solution in order to completely remove all the wax. It is a matter of trial and error to determine the amount of treatment necessary to remove all the wax. The solution is then decantered from the mass of fibers and the treated floss is washed with clean water at a temperature not above 70° F. until all of the sodium phosphate solution has been rinsed out.

Both the washing water and the chemical solution should be reserved for treatment to recover the waxy material dissolved therein according to any of the multitude of processes available to accomplish this desirable object. The dewaxed fibers when observed under the microscope show different properties from the natural floss, being more porous and having a higher cellulose content. They are also rougher and lend themselves more readily to the preparation of felt therefrom.

The second step in my process consists in the preparation of the felt from the dewaxed floss fibers. The well-washed floss is immersed in an aqueous solution of suitable adhesive consisting preferably of "latex rubber" (40%) colloidally suspended in water, aided by the addition of about 2% to 5% of glycerin. The immersion of the fibers in this solution is carried out in the cold and the time necessary for proper cohesion of the fibers is usually about 25 minutes.

Although I do not perfectly understand the theory underlying the reactions taking place in this adhesive bath, I believe that the colloidal adhesive is attached in tiny droplets to the individual fibers of the milkweed floss. At each point of intersection of two of the fibers, a tiny drop of the colloidal adhesive bridges the fibers and cements them together. Therefore, when the felt fibers, after much stirring, are removed from the adhesive bath and dried, the individually cemented fibers assume a homogeneous porous structure with many open interstices, because the adhesive solution does not fill the interstices, but merely cements the point of contact between the individual fibers.

Upon removal from the adhesive solution, the milkweed floss is drained upon perforated media allowing the escape of the adhesive solution and is subsequently rolled, pressed and beaten in the well known manner of the animal felt art.

I am not restricted to the use of rubber latex as an adhesive, but may, instead, employ such common adhesives as gum arabic or gum tragacanth. It is important in all cases, however, that an adhesive solution be prepared which is capable of readily being drained from the felted milkweed floss fibers, for it is desirable to have only a minute quantum of adhesive remain between the fibers to cement them together in the manner above described. Should any large quantity of adhesive remain within the felt and dry up in the interstices thereof, the felt would lose the flexibility, lightness and the heat insulating properties which comprise its most important merits over animal felts. Although the degree of stability of the fibers of my milkweed depends on the content of adhesive therein, too large a percentage of adhesive in the protective colloidal acts unfavorably and even in derogation of the properties desired.

Although I have described one application of my new felting process to the vegetable fiber felt art as exemplified by the utilization of milkweed floss felt, I do not wish to be restricted thereto, for it is obvious that my methods may be applied to other fibers both animal and vegetable with which difficulty has been experienced in regard to felt formation. For instance, the only animal fibers now considered suitable for the preparation of felt are wool, beaver hair and rabbit hair, because these are some of the few animal fibers having the rough texture which lends itself to felting. Wool fibers, for instance, have many minute projections or corrugations upon their outer surfaces which act as microscopic hooks to tie the fibers to each other in the felt. Animal fibers which are smooth, and this includes the multitude of animal fibers not included in the previous recitation of useful felting fibers, have been rejected for the production of felt, because no suitable methods were available to cause cohesion of these smooth fibers. My method for the preparation of felt supplies a substitute for natural felting capacity by providing each individual smooth fiber with artificial, colloidal "hooks" which serve the same purpose as the natural corrugations of, say, wool fibers and thus makes possible felt formation with all fibers, both vegetable and animal, now known to the textile art.

I claim:

1. The preparation of felt from milkweed floss comprising soaking the floss in a cool dilute aqueous solution of sodium phosphate in the presence of a wetting agent until the fibers of the floss are substantially free from wax, decanting the solution from the floss, washing the floss with cool water, immersing and vigorously stirring the floss in an aqueous solution containing 2% to 5% of glycerin and 10% to 20% of latex rubber until all of the fibers have been contacted by said adhesive solution and they are thoroughly felted, draining said adhesive solution from the floss, and drying the floss in thin layers of desired dimensions.

2. The preparation of felt from milkweed floss comprising soaking the floss in a dewaxing solution in the presence of a wetting agent, rinsing the floss with water, immersing and agitating the floss in a colloidal adhesive suspension of latex, removing all but a silght quantum of adhesive from the felted floss, and drying the resulting felt.

3. In the preparation of felt from smooth fibers, the method of inducing felt formation comprising treating said fibers with a colloidal adhesive solution of the group consisting of latex, gum arabic, and gum tragacanth followed by draining and drying of the fibers thereby causing said fibers to form a soft, flexible porous felt whose individual fibers are mechanically joined by colloidal adhesive only at their points of intersection.

BORIS BERKMAN.